Aug. 25, 1970     D. T. BARISH     3,525,491

PARACHUTE

Filed May 10, 1968     2 Sheets-Sheet 1

INVENTOR
DAVID T. BARISH
BY Burgess, Dinklage
ATTORNEYS.

Aug. 25, 1970     D. T. BARISH     3,525,491
PARACHUTE
Filed May 10, 1968     2 Sheets-Sheet 2
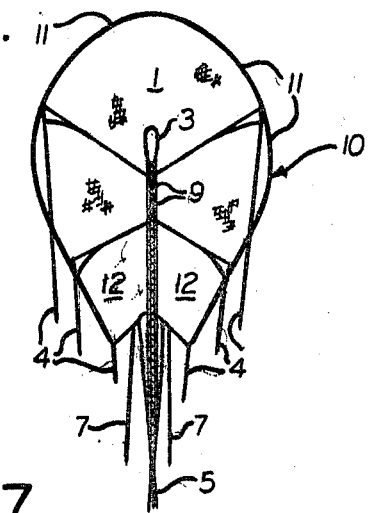
FIG. 6.
FIG. 7.
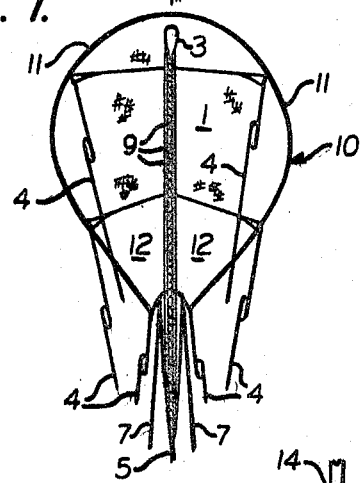
FIG. 9.
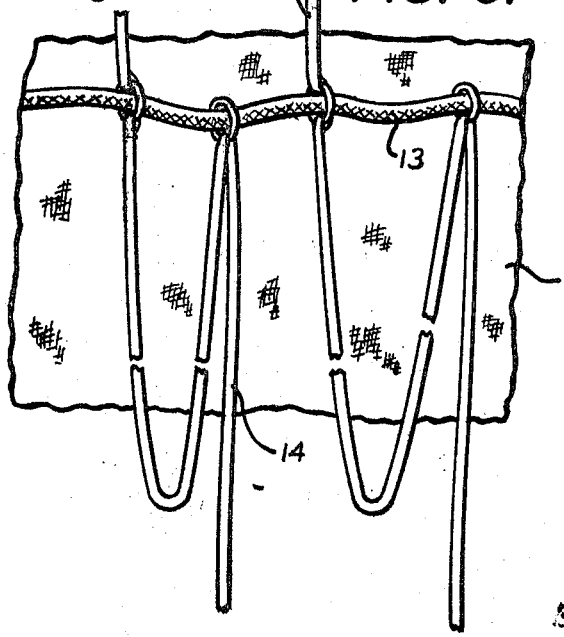
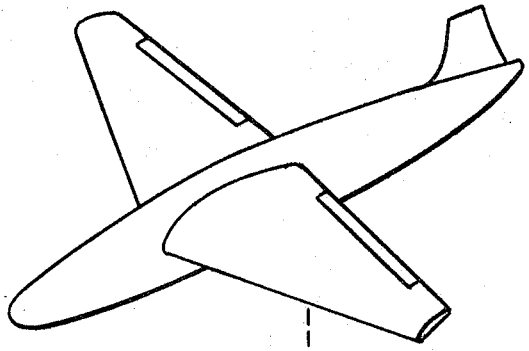
FIG. 10.
INVENTOR
DAVID T. BARISH
BY
Burgess, Dinklage & Sprung
ATTORNEYS.

United States Patent Office 3,525,491
Patented Aug. 25, 1970

3,525,491
PARACHUTE
David T. Barish, New York, N.Y., assignor to Barish Associates, Inc., New York, N.Y.
Filed May 10, 1968, Ser. No. 728,212
Int. Cl. B64d *17/02*
U.S. Cl. 244—142                                      14 Claims

ABSTRACT OF THE DISCLOSURE

Improved parachute construction, particularly for flexible wing-type parachutes, wherein the canopy is joined together along at least a portion of at least one of the leading or trailing edges thereof and the suspension lines depending from the leading and/or trailing edges are shortened in such manner that they can be let out at selected intervals either in predetermined sequence and interval or in a manner randomly determined at the time in response to the then prevalent conditions. Improved parachute having shortened trailing and/or leading edges which can be let out as desired.

---

This invention relates to parachutes. It more particularly refers to flexible wing-type parachutes. It still more particularly refers to means for effecting better and more accurate control of such parachutes in flight.

Parachutes can generally be distinguished from other aircraft by the fact that their aerodynamic surface is usually made of cloth or other limp, flexible, nonself-supporting in the sense that except under the dynamic equilibrium conditions of flight, neither the canopy, nor the canopy material is self-supporting. Thus a parachute canopy is distinguishable from an airplane or airfoil by the fact that an airplane wing is relatively rigid and self-unsupporting, while the parachute canopy is extremely soft and unself-supporting. It should further be noted that, while both are flexible, this flexibility is in no way comparable or really related to each other. An analagous comparison is between the flexibility of a metal, self-supporting article, such as a spring, which is entirely different and of a different order of magnitude, for example, than the flexibility of cloth.

Flexible wing-type parachutes are generally well-known today. They find application in sports, military and space vehicle recovery applications. Flexible wing-type parachutes are generally distinguishable from conventional, generally circular, parachutes by the fact that flexible wing parachutes are truly airfoil in structure, having leading and trailing edges, while conventional circular parachutes have a peripheral edge portion and an apex aperture. In some respects the peripheral edge portion of a conventional parachute can be considered as a "leading" edge; however, this is not a truly accurate characterization from an airfoil point of view since the conventional circular type of parachute does not have airfoil wing capability of controlled lateral motion, including positive lift, glide and soarability.

Thus it can be said that flexible wing-type parachutes have excellent lateral motion characteristics and controllability. However, conventional, circular parachutes have advantageous drag and deployment characteristics which are particularly desirable when lowering rather heavy objects to a substantially soft landing.

As can be seen, it would be most desirable to provide a parachute which had the advantages of both the circular parachute as to drag and deployment and the flexible wing as to lateral mobility and controllability. In the past this has been sought after but never quite achieved in an efficient manner.

It is therefore an important object of this invention to provide a novel type of flexible wing glide-type parachute.

It is another object of this invention to provide a novel parachute design and construction which permits the user to selectively determine the glide and drag capability and performance thereof.

Other and additional objects will become apparent from a consideration of this entire specification, including the drawing and claims hereof.

In accord with and fulfilling these objects, one aspect of this invention resides in a flexible wing type parachute having a leading and a trailing edge extending spanwise across the wing and a multiplicity of suspension lines depending from a multiplicity of points on the canopy which points are spaced both chordwise and spanwise.

It is understood that in certain known flexible wing structures, the suspension lines depend from catenary shaped fins which fins extend in a chordwise direction. As used herein, the expression that the suspension lines depend from a multiplicity of chordwise points, is intended to embrace these lines depending directly from the canopy or from fins which themselves depend from the canopy, which fins may be any desirable shape. It is further to be understood that when some of the suspension lines are said to depend from the leading or trailing edge of the canopy, this expression is intended to embrace and encompass these lines depending directly from the canopy substantially at or proximate to the leading and/or trailing edge or having a member intermediate the suspension line and the canopy at or proximate to the leading and/or trailing edge, e.g., a fin, whether catenary shaped or not. It will further be appreciated that when the leading and/or trailing edges of the canopy (wing) are referred to, these expressions are used within their full connotation to the art, i.e., a leading or trailing edge may not be a fine, sharp, distinct line but rather may be a surface, particularly an arcuate surface, of flexible material having a dynamic "leading" or "trailing" line or edge.

Thus, according to and fulfilling the objects set forth above and within the purview of the above definitions, one aspect of this invention resides in the provision of a flexible wing canopy having a multiplicity of suspension lines depending from the leading and trailing edges thereof in position and relation to support a weight, means to join at least a portion of the trailing edge of said flexible canopy to itself whereby forming said flexible wing into a substantial dome-shape, and means to release at least a portion of said edge joining means whereby to form upon said release a portion of said flexible wing canopy.

Portions of the trailing edge of the flexible canopy can be joined to other portions of such edge by substantially any means commonly used for detachably fastening fabric together. Thus it is possible, and within the scope of this invention, to provide one side of the trailing edge of the canopy with closed rope loops extending therefrom, and the other side of the trailing edge with apertures therein, possibly reinforced. The two sides of the trailing edge can then be detachably attached together by inserting a rope loop through a corresponding opposite aperture and through the rope loop portion extending through the aperture disposed immediately adjacent thereto in the direction of the center of the canopy. The last rope loop at the bottom of the attached portions of the canopy can be held with a lanyard or other device in a fixed position, thus forming a dome-shaped canopy. If the lanyard holding the last rope loop is released, internal air pressure will force the attached portions of the trailing edge apart, causing each successive rope loop to slip out of engagement with its next preceding rope loop and aperture, thereby "opening" the trailing edge and converting the dome-shaped parachute into a glide-wing parachute.

The portions of the trailing edge may be detachably attached together in a somewhat similar manner by providing rope loops on each side of center of the trailing edge and successively interlocking oppositely disposed rope loops with each other and with the next succeeding rope loop so that similarly as the holding power on the last rope loop is released, internal air pressure will force disengagement of the loops one from the other. It will be readily apparent that many other similar detachable attachment means can likewise be used within the purview of this invention.

According to another aspect of this invention, means are provided for suitably shortening at least some of the suspension lines depending from said canopy in such manner and to such a degree as to cant the dome-shaped canopy into its proper attitude for efficient drag operation in a manner akin to that of a conventional "round" parachute; and line shortening release means are provided adapted to operate in conjunction with the edge joining release means set forth above whereby to suitably lengthen the appropriate suspension lines in conjunction with releasing of appropriate portions of a joined edge.

Understanding of this invention will be facilitated by reference to the accompanying drawing in which:

FIG. 6 is an isometric view of general flexible wing canopy having a fully joined trailing edge deployed as viewed from below and in front of the canopy;

FIG. 7 is similar to FIG. 6, showing some of the suspension lines shortened;

FIG. 9 is an isometric view of a line shortening means and release means therefor;

FIG. 10 is a sequential view of deployment of a parachute according to this invention.

Figure 1:
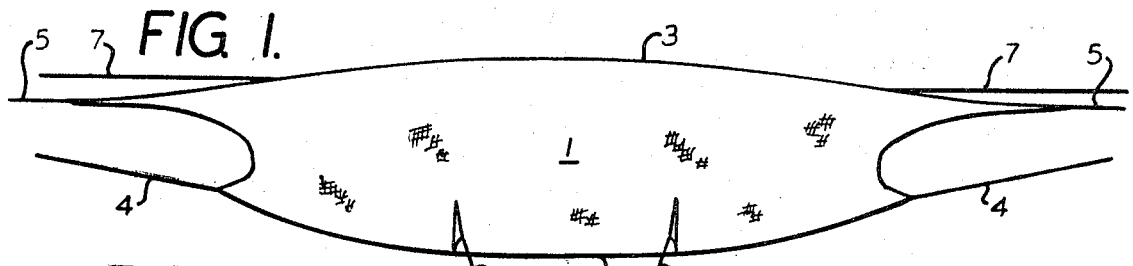
FIG. 1 is a layout view of a general flexible wing canopy.
Figures 2, 8:
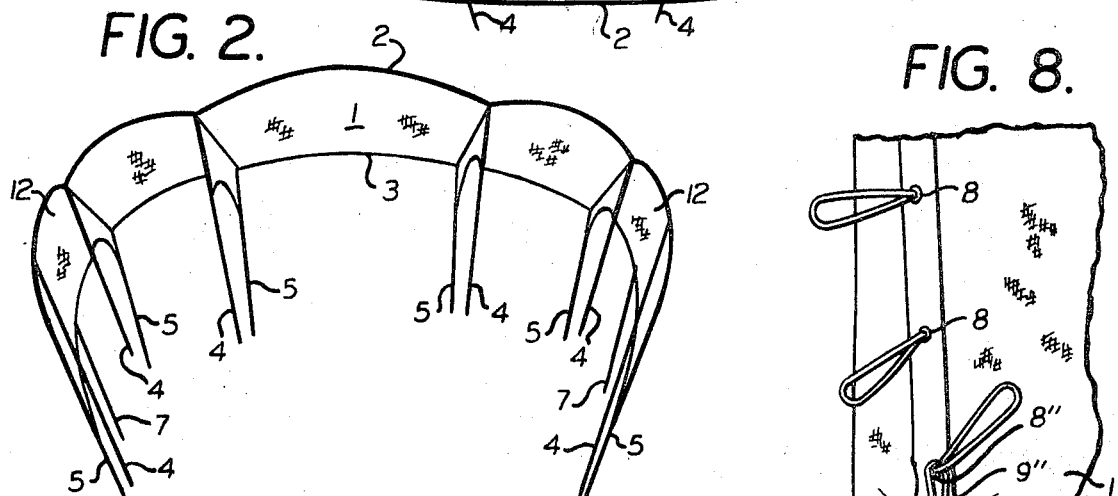
FIG. 2 is an isometric view of a general flexible wing canopy fully deployed as viewed from below and in front of the canopy.
FIG. 8 is an enlarged view of an edge joining means.

Referring now to the drawing, and particularly to FIGS. 1 and 2 thereof, a flexible wing has a canopy 1 with a leading edge 2, a trailing edge 3. Leading edge suspension lines 4 and trailing edge suspension lines 5 are provided to support a load (not shown). Control lines 7 may be provided as is usual in this art.

Figure 3:
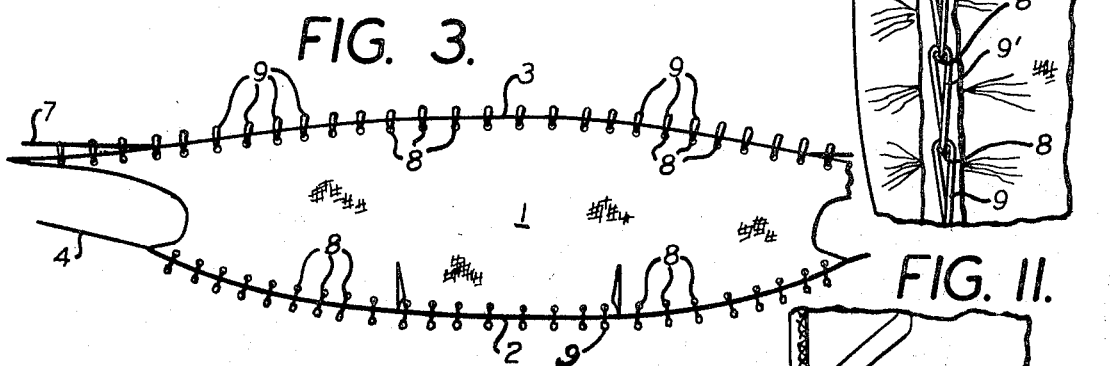
FIG. 3 is a plan view of a general flexible wing canopy similar to FIG. 1, having a means for joining one or more parts of one or more edges.

Referring now to FIG. 3, there is shown the flexible wing canopy of FIG. 1 with a multiplicity of spaced eyelet means 8 provided along its leading and trailing edges 2 and 3. To the eyelets 8 are affixed short loops of rope 9 which are one form of edge-joining means.

Figures 4, 5, 11:
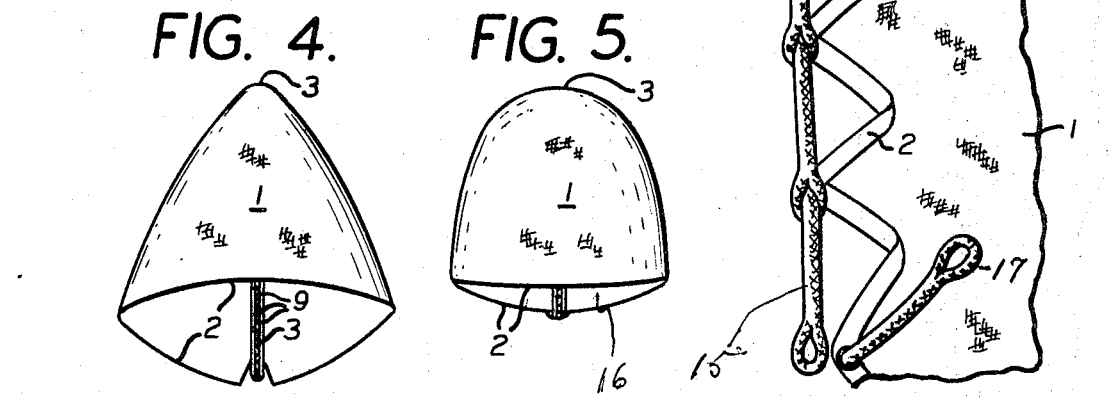
FIG. 4 is a plan view showing a canopy with a fully joined trailing edge without any attitude compensating suspension-line shortening.
FIG. 5 is similar to FIG. 4 showing a canopy having a joined trailing edge with attitude correction into a proper dome shape.
FIG. 11 is an enlarged view of edge-joining and reefing means.

A trailing edge joined canopy is shown in FIG. 4. This same canopy position—corrected to a desirable attitude—is shown in FIG. 5.

The loops of rope 9 shown in FIGS. 3 and 8 are suitably just equal to or slightly shorter than the space between the eyelets 8. In this manner it is possible to insure tension on the loops. The loops are interlaced through their corresponding eyelets and thus a canopy edge is joined, as shown in FIG. 8, as follows. A next successive loop 9' is threaded through eyelet 8 and then is placed through a first loop 9 and pulled tight thus holding the flexible material between the loops 9 and 9' together. A next successive loop 9'' is threaded through eyelet 8' and then is placed through the loop 9' and pulled tight, whereby repeating the folding of the flexible material between the eyelets 8' and 8''. This process can be repeated for any length desired over one or more portions of either or both canopy edges.

Where it is desired to shorten a joined edge, that is reef it, such can be accomplished, as shown in FIG. 11, by providing loops of rope 15, which are in some way joined to the canopy edge 2, and which are shorter than the distance between points on the canopy edge where such loops are joined. Thus, when these loops are interlaced, in the same or a similar manner to that described above with respect to edge joining and FIG. 8, the canopy edge 2 to which they are joined buckles and thus becomes "reefed." It is within the spirit and scope of this invention to "reef" a canopy edge in this manner with or without joining portions of such canopy together.

It will be appreciated that it is possible and practical, for example, to fully join the entire trailing edge of an airfoil canopy together, whereby to obtain a rearwardly canted dome-shaped parachute. It is then possible to shorten some of the suspension lines to adjust the attitude of the dome-shaped parachute as shown in FIG. 5. It is then still further possible to restrict and close the "mouth" 16 of the dome-shaped parachute by reefing all or a part of the leading edge. This reefing may or may not be associated with some joining together of portions of the leading edge.

As particularly shown in FIG. 11, there is a preferred structure to the "loop" 15. This structure is particularly advantageous in reefing an edge although it can be used in other edge-joining applications. This preferred cord loop 15 has a substantially solid body portion, which is joined at one end to the canopy edge in question. The other end of this body is in the shape of a rather small loop 17, suitably just about big enough to permit passage of the next adjacent cord body and loop therethrough. The cord body and the peripheral portions of the small loop itself may be made of any suitable material: fibrous, filamentary, unitary molded construction, or the like. It is the shape of the final looped cord, rather than the specific materials or methods of construction, which is important and preferred. The looped cord may actually be made of fibers, natural or synthetic, molded plastic, metal, etc. The loop and/or the body portion may be reinforced or sheathed if such seems desirable.

As can be appreciated from the above description of the shown means for joining two portions of a leading or trailing edge together to form a generally dome-shaped parachute, the edges are held together by a series of interlocked loops. It will be appreciated that tension must be exerted upon the "last" pulled through loop in order to hold all of the loops in correct alignment and to keep the joined or reefed edges together. This can be accomplished by providing a line (a control line) from the "last" loop to a position where it is accessible to the person being carried by the parachute or to other control means.

As can be readily appreciated, the air pressure inside the "dome-shaped" canopy will tend to force the thus joined edge portions apart whereby imparting tension to the interlocked loops. Only the holding line from the "last" loop maintains the loop series interlocked and thus holds the edge portions together. In order to convert the dome-shaped canopy to a winged, airfoil shape, it is only necessary to relax tension on the "last" loop. When this tension is relaxed, the internal air pressure will force the loops to disengage from each other (unzip), whereby permitting the formerly joined edge portions to move apart and assume a good airfoil shape.

It is within the scope of this invention to join portions of an edge of a flexible wing, while maintaining the length of these edge portions substantially intact. It is also within the purview of this invention to tailor the shape of the "dome-shaped" parachute canopy by adjusting the length of the edge portions which have been joined together. This can be accomplished by providing suitably shortened loops of the type set forth above, so positioned as to "gather" portions of the joined edge portions whereby to effectively shorten the overall joined edge length. Release of the joined edge portions may be accomplished in the same manner as set forth above.

In particular, tension on the "last" loop may be released by any suitable mechanism. For example, the parachutist may maintain the edge portions joined by simply holding a line attached to the "last" loop. Alternatively, this control line may be affixed to the harness or other portion of the parachute. The joined edge portions may be "unzipped" by merely letting go of the control line. Alternatively, the control line may be severed, e.g., mechanically with a knife or pyrotechnically, etc. This severing may be by remote control, which control may be activated under predetermined conditions, such as barometrically or by means of other instruments. Alternatively, the severing may be optionally controlled by the parachutist according to the conditions then obtaining.

It is within the scope of this invention to provide the dome-shaped (intermediate stage) parachute with or without an apex aperture. This aperture can be suitably provided by folding the edge (suitably the trailing edge) to be joined such that the two thus formed portions thereof are adjacent. These adjacent portions are then laced together as aforesaid with the lacing stopping short of the fold point. The air pressure within the dome will cause stress on the laced edge portions and on the lacing, tending to force the joined portions apart and thereby opening the apex aperture (where there is not restraining lacing) as desired. Of course, if the dome-shaped intermediate parachute is to retain this shape for a very short time, or if the stability of such intermediate configuration is not particularly critical, the apex aperture may be omitted if desired.

As seen in FIG. 6, upon inflation and deployment of a flexible wing having joined trailing edge portions, a generally dome-shaped canopy 10 is produced, having a peripheral edge 11 which corresponds to, and will later form, the leading edge of a flexible wing canopy upon complete deployment and release of the joined trailing edge portions. The leading edge suspension lines 4 depend from about the peripheral edge 11 while the trailing edge suspension lines 5 are all bunched together and depend from along substantially one line or area of the "canopy." This line corresponds to the joined-edge portion thereof.

A comparison of FIGS. 2 and 6 will clearly indicate that the extreme outside parts or "sides" 12 of the fully deployed canopy, as shown in FIG. 2, are part of the peripheral edge of the dome as seen in FIG. 6. It is possible to leave these sides as portions of the canopy. However, it is preferred that the side, or lateral, areas be enfolded or tied together with the lateral suspension lines to form one of the suspension lines depending from the dome intermediate shape parachute. It has been found to be practical to enclose these lateral or side portions in themselves by providing eyelets and loops, as described above with respect to edge-portion joining, and to "zip" a folded or rolled portion of the sides of the canopy together. Thus, the "left" side of the canopy can be wrapped around the "right" side of the canopy. Eyelets can be provided along the trailing edge of the "left" side and looped rope can be provided on the "left" side spaced a suitable distance from the eyelets. The "right" side is placed "in" the "left" side and the left side wrapped therearound. The loops are placed through the opposite eyelets and then interlocked with each other. In this regard it is desirable to provide the loops of such length that they will be under some amount of tension upon interlocking. The separation of the canopy sides can be accomplished by the same means as set forth above for unzipping attached edge portions. The holding (control) line can be part of the joined edge portion control line or it can be a separate line. Alternatively, the side fastening loops can continue right to, and tie into, the edge portion, fastening loops in such manner as to be unzippable as a continuous unit. Where separate controls are provided, each may be independently operative or one unzipping operation may initiate unzipping of the other loops.

As can be seen from the view of FIG. 6, while the canopy 10 is dome-shaped and thus has excellent drag characteristics, it is canted slightly toward that portion of the canopy from which the rolled sides and trailing edge suspension lines 5 depend. It is therefore a preferred aspect of this invention to provide for appropriate shortening of at least some of the suspension lines in order to bring the dome-shaped canopy 10 into a more upright attitude as shown in FIG. 7. As shown in this figure, the leading edge suspension lines 4 are shortened an amount which is proportional to their position about the peripheral edge 11. Thus, for example, where the entire trailing edge 3 is joined together, the leading edge suspension lines 4 are shortened a progressively greater amount from the sides 12 toward the center of the canopy (that is, the point that will be the center upon full deployment of the canopy as a wing). This technique will tend to "round out" the dome canopy and to cant it into a substantially upright attitude.

Once the desired drag effect has been accomplished, through the conversion of the flexible wing into a dome-shaped, circular type parachute, the joined edge portions and foreshortened lines can be released gradually or suddenly, as the case may be and as desired, by simply releasing the hold means, such as the hold line 13 on the edge joining loops 9 and removing the line-shortening stay 14 from its position holding the shortened lines in their proper position.

It should be appreciated that it is within the scope of this invention to join together portions of the leading edge 2 and shorten the trailing edge suspension lines 5 in the same manner and for the same purpose as has been described above with relation to joining together portions of the trailing edge 3 and shortening the leading edge suspension lines 4. It is further within the spirit and scope of this invention to join together portions of the leading edge and join together portions of the trailing edge, with or without shortening appropriate leading and/or trailing edge suspension lines in order to form the flexible wing canopy of this invention into an appropriate dome-shaped canopy.

The exact spacing of edge portion joining means and the exact amount of shortening of both edge portions and suspension lines are a matter of relatively simple straightforward mathematical computation given the span- and chordwise dimensions and camber of the fully-developed flexible wing and given the approximate desired dimensions of the dome-shaped "intermediate" parachute.

One specific set of parameters which has been found to be well-suited to a ninety (90) foot span flexible wing having a 27 foot chord length at the center provides for trailing edge eyelets along the whole length spaced 6 inches apart with loops of 5½ inch length extending therefrom. The center leading edge suspension line was shortened 20 feet and the lines to either side shortened a proportionately smaller amount until the outside suspension lines were reached which were not shortened at all.

What is claimed is:
1. A flexible wing parachute comprising a canopy having a leading edge and a trailing edge; suspension lines depending from a multiplicity of points on said canopy; means separate from said suspension lines attached to at least a portion of at least one edge of said canopy to join substantial portions of said edge to form a dome-shaped canopy; and means to release said edge joining means whereby to convert said dome-shaped canopy to a substantially airfoil shaped canopy wing.

2. A parachute as claimed in claim 1 having edge joining means along the entire trailing edge thereof.

3. A parachute as claimed in claim 1 having edge joining means along the entire leading edge thereof.

4. A parachute as claimed in claim 1 having edge joining means along at least a portion of both said leading and trailing edges thereof.

5. A parachute as claimed in claim 1 having means adapted to shorten at least some of said suspension lines.

6. A parachute claimed in claim 5 wherein said line shortening means is operatively associated with said leading edge suspension lines and said trailing edge has edge joining means operatively associated therewith.

7. A parachute as claimed in claim 5 having suspension line shortening release means operatively associated with said line shortening means.

8. A parachute as claimed in claim 6 wherein the leading edge suspension lines are shortened a decreasing amount from the geometric center of said leading edge toward the outside extremities thereof.

9. A parachute as claimed in claim 1 wherein said edge joining means comprises a multiplicity of eyelets along a portion of said edge and loop means operatively associated with an opposing portion of said edge adapted to be mated with said eyelets by being passed therethrough wherein said loops are adapted to interlock with each other after being passed through said eyelets.

10. A parachute as claimed in claim 5 wherein said line shortening means comprises loops on said suspension lines spaced apart a predetermined distance corresponding to a desired degree of shortening; and retractable holding means through said loops.

11. A parachute as claimed in claim 9 wherein said loops have one end portion adapted to be affixed tightly to said edge portion and the other end portion comprising a small loop having a diameter slightly larger than the loop cord outside diameter, and cord means therebetween.

12. A parachute as claimed in claim 1 having means for releasably joining substantially all of the trailing edge thereof together, whereby to form a substantially dome-shaped canopy; means for releasably shortening the leading edge suspension line thereof a progressively greater amount from the side edges of said canopy toward the center of the leading edge thereof; and means for releasably reefing the leading edge of said canopy.

13. A parachute claimed in claim 12, wherein said trailing edge joining extends to a point spaced from a fold point of said trailing edge, whereby forming an apex aperture.

14. A parachute as claimed in claim 1, wherein said edge joining means comprises a cord loop having a substantially solid body adapted to be affixed to a canopy edge at one end thereof and having a small integral loop at the other end thereof, which loop is slightly larger than the thickness of said body.

References Cited

UNITED STATES PATENTS

| | | | |
|---|---|---|---|
| 3,141,640 | 7/1964 | Sutliff et al. | 244—138 |
| 3,356,316 | 12/1967 | Forehand | 244—43 |

FOREIGN PATENTS

| | | |
|---|---|---|
| 1,107,168 | 8/1955 | France. |
| 1,406,485 | 6/1965 | France. |

MILTON BUCHLER, Primary Examiner

J. E. PITTENGER, Assistant Examiner

PO-1050
(5/69)

UNITED STATES PATENT OFFICE
CERTIFICATE OF CORRECTION

Patent No. 3525491  Dated August 25, 1970

Inventor(s) David T. Barish

It is certified that error appears in the above-identified patent and that said Letters Patent are hereby corrected as shown below:

Column 1, line 32   (Spec. p. 2, line 5)

After "supporting" insert --material. This aerodynamic surface or canopy is non-self-supporting--

(SEAL)
Attest:

Edward M. Fletcher, Jr.
Attesting Officer

WILLIAM E. SCHUYLER, JR.
Commissioner of Patents